United States Patent
Nagano et al.

(10) Patent No.: US 12,185,020 B2
(45) Date of Patent: Dec. 31, 2024

(54) VIDEO PROCESSING APPARATUS

(71) Applicant: Panasonic Intellectual Property Management Co., Ltd., Osaka (JP)

(72) Inventors: Yuki Nagano, Tokyo To (JP); Yuji Matsumoto, Kanagawa Ken (JP); Yohei Ohmura, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 16 days.

(21) Appl. No.: 18/228,474

(22) Filed: Jul. 31, 2023

(65) Prior Publication Data

US 2023/0379431 A1 Nov. 23, 2023

Related U.S. Application Data

(63) Continuation of application No. PCT/JP2021/046091, filed on Dec. 14, 2021.

(30) Foreign Application Priority Data

Feb. 12, 2021 (JP) .................... 2021-020405

(51) Int. Cl.
| | | |
|---|---|---|
| G07C 5/08 | (2006.01) | |
| H04N 5/77 | (2006.01) | |
| H04N 23/65 | (2023.01) | |
| H04N 23/667 | (2023.01) | |
| B60R 16/03 | (2006.01) | |

(52) U.S. Cl.
CPC ............ *H04N 5/77* (2013.01); *G07C 5/0866* (2013.01); *H04N 23/65* (2023.01); *H04N 23/667* (2023.01); *B60R 16/03* (2013.01)

(58) Field of Classification Search
CPC .................................................. G07C 5/0866
See application file for complete search history.

(56) References Cited

FOREIGN PATENT DOCUMENTS

| | | |
|---|---|---|
| JP | 2012-169754 A | 9/2012 |
| WO | 2009/011078 A1 | 1/2009 |

OTHER PUBLICATIONS

International Search Report issued in WIPO Patent Application No. PCT/JP2021/046091, dated Feb. 15, 2022, along with an English translation thereof.
Written Opinon of the International Searching Authority issued in WIPO Patent Application No. PCT/JP2021/046091, dated Feb. 15, 2022, along with an English translation thereof.

*Primary Examiner* — Y Lee
(74) *Attorney, Agent, or Firm* — GREENBLUM & BERNSTEIN, P.L.C.

(57) ABSTRACT

A video processing apparatus is mounted on a vehicle and stores a video from a camera that captures at least one of outside or inside of the vehicle. The video processing apparatus includes a memory that stores therein a computer program; and a processor that is connected to the memory. The processor performs processing by executing the computer program. The processing includes receiving the video; and storing the video in an external storage medium in a case where a temperature of the video processing apparatus is less than a predetermined threshold, and storing the video in a storage device incorporated in the video processing apparatus in a case where the temperature is equal to or higher than the threshold.

15 Claims, 5 Drawing Sheets

VIDEO PROCESSING APPARATUS

CROSS-REFERENCE TO RELATED APPLICATIONS

This application is a continuation of International Application No. PCT/JP2021/046091, filed on Dec. 14, 2021, which claims the benefit of priority of the prior Japanese Patent Application No. 2021-020405, filed on Feb. 12, 2021, the entire contents of which are incorporated herein by reference.

FIELD

The present disclosure relates to a video processing apparatus.

BACKGROUND

There is known a technique of capturing a video by a camera or the like mounted on a vehicle, storing the captured video, and utilizing the video for various uses.

Meanwhile, it is desirable that the captured video is stored properly.

An object of the present disclosure is to provide a video processing apparatus capable of properly storing a video captured by a camera mounted on a vehicle.

SUMMARY

A video processing apparatus according to an embodiment of the present invention is mounted on a vehicle and stores a video from a camera that captures at least one of outside or inside of the vehicle. The video processing apparatus includes a memory that stores therein a computer program; and a processor that is connected to the memory. The processor performs processing by executing the computer program. The processing includes receiving the video; and storing the video in an external storage medium in a case where a temperature of the video processing apparatus is less than a predetermined threshold, and storing the video in a storage device incorporated in the video processing apparatus in a case where the temperature is equal to or higher than the threshold.

DETAILED DESCRIPTION

Embodiment

Configuration Example of Vehicle

Figure 1:
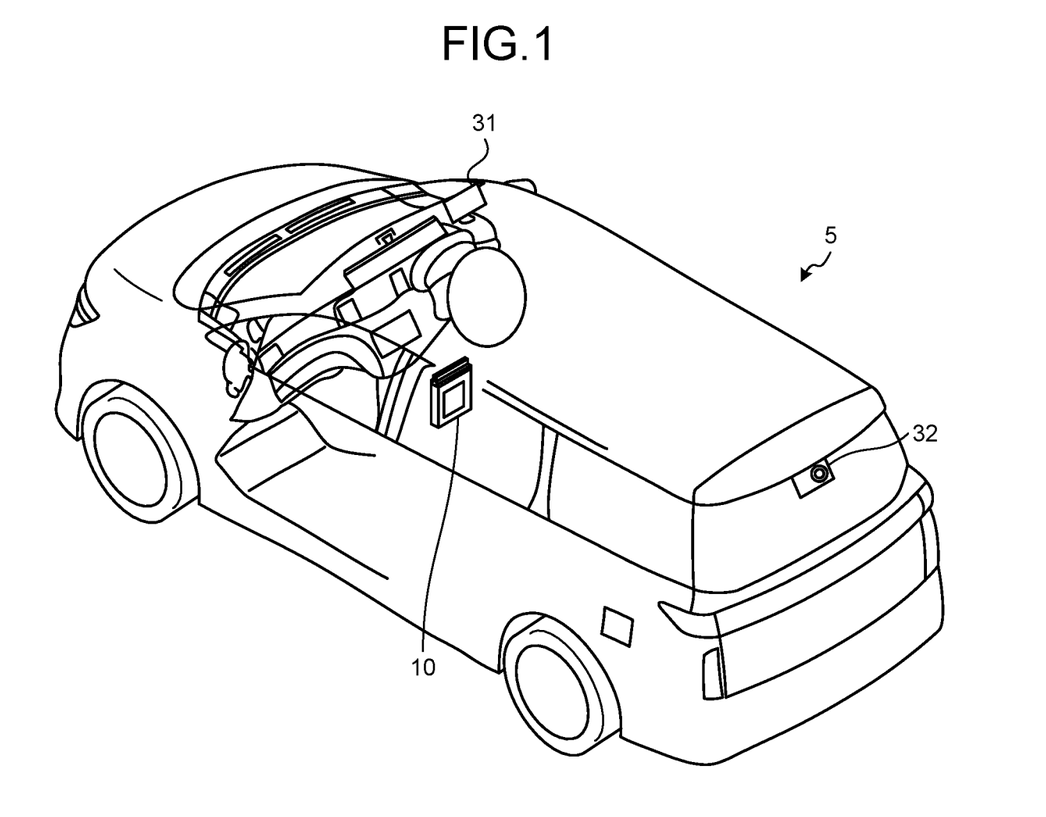
FIG. 1 is a schematic diagram illustrating an example of a vehicle including a drive recorder unit according to the present embodiment.

FIG. 1 is a schematic diagram illustrating an example of a vehicle 5 including a drive recorder unit 10 according to the present embodiment. As illustrated in FIG. 1, the vehicle 5 of the present embodiment includes, for example, the drive recorder unit 10, a rear camera 32, and a front camera 31. In addition, the vehicle 5 includes an electronic control unit (ECU) (not illustrated) and the like. Moreover, the vehicle 5 may include a vehicle interior camera (not illustrated) that captures the interior of the vehicle.

The front camera 31 is disposed, for example, on a windshield of the vehicle 5. The front camera 31 captures the outside of vehicle 5 and generates a video signal. The front camera 31 captures, for example, the front of the vehicle 5. The video signal generated by the front camera 31 includes, for example, information of a front video. The front video refers to as a video of the front of the vehicle 5 captured by the front camera 31. The video here may be a still image or a moving image. The front camera 31 is an example of a video-capturing device.

The rear camera 32 is disposed, for example, on a rear glass of the vehicle 5. The rear camera 32 captures the outside of vehicle 5 and generates a video signal. The rear camera 32 captures, for example, the rear of the vehicle 5. The video signal generated by the rear camera 32 includes, for example, information of a rear video. The rear video refers to as a video of the rear of the vehicle 5 captured by the rear camera 32. The rear camera 32 is an example of the video-capturing device.

The drive recorder unit 10 is disposed in the vehicle interior. The drive recorder unit 10 is housed, for example, in a console box of the vehicle 5. The drive recorder unit 10 may be disposed, for example, near a room mirror. The drive recorder unit 10 performs video processing on the video signals received from the front camera 31 and the rear camera 32, and stores the videos. For example, the drive recorder unit 10 is an example of the video processing apparatus. Furthermore, the video processing includes, for example, the adjustment of color and contrast performed so as to be suitable for vehicle exterior video storage.

Configuration Example of Video Processing System

Figure 2:
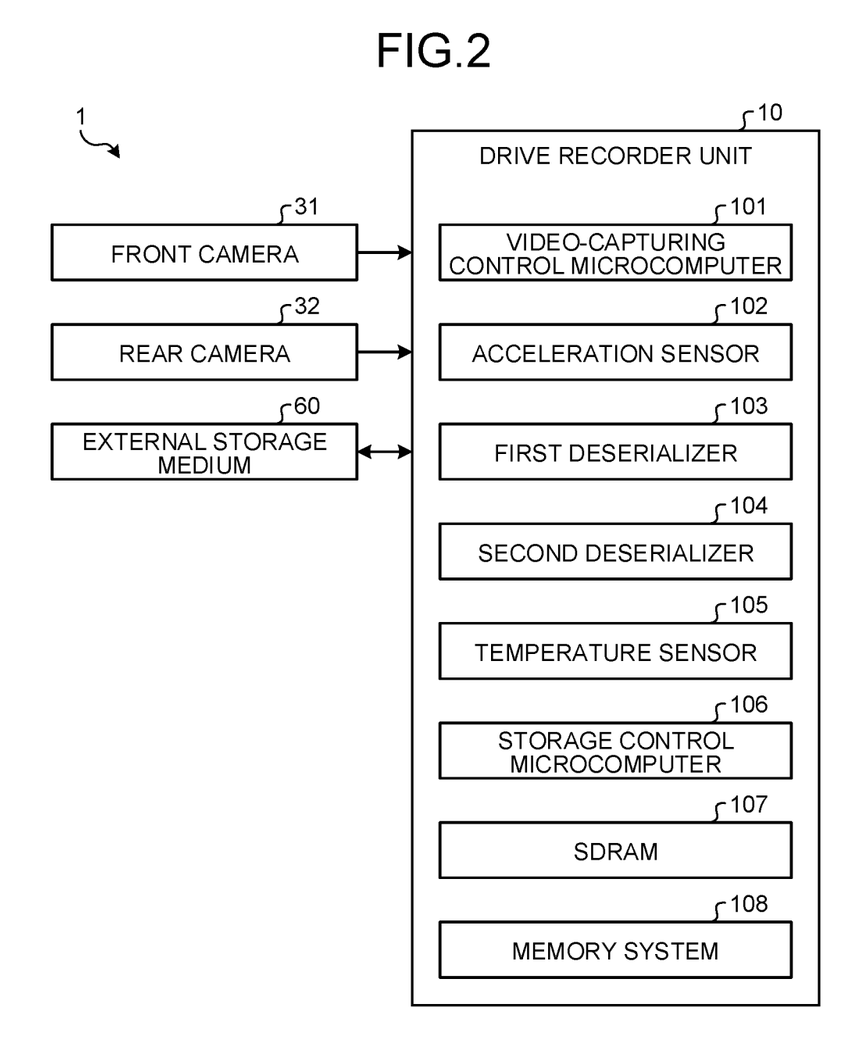
FIG. 2 is a block diagram illustrating an example of a configuration of a video processing system according to the present embodiment.

FIG. 2 is a block diagram illustrating an example of a configuration of a video processing system 1 according to the present embodiment. As illustrated in FIG. 2, the video processing system 1 of the present embodiment includes the drive recorder unit 10, the front camera 31, the rear camera 32, and an external storage medium 60. The video processing system 1 of the present embodiment is configured to be mountable on, for example, the vehicle 5 described above.

The external storage medium 60 is a storage medium that stores videos captured by the front camera 31 and the rear camera 32. The external storage medium 60 is detachable from the drive recorder unit 10. The external storage medium 60 is, for example, a memory card such as a microSD card. First, the drive recorder unit 10 causes the external storage medium 60 to store a video. By another computer reading and reproducing the external storage medium 60, the user can check the video. The external storage medium 60 generally has lower resistance to high temperatures than a memory system 108, which is a storage device incorporated in the drive recorder unit 10.

The drive recorder unit 10 includes a video-capturing control microcomputer 101, an acceleration sensor 102, a first deserializer 103, a second deserializer 104, a temperature sensor 105, a storage control microcomputer 106, a synchronous dynamic random access memory (SDRAM) 107, and the memory system 108.

The drive recorder unit 10 is a unit that stores a video captured by the front camera 31 or the rear camera 32. The drive recorder unit 10 stores, for example, a video of the outside of the vehicle 5 when the vehicle 5 is traveling. The drive recorder unit 10 may receive a video of the interior of the vehicle captured by the vehicle interior camera and store the video. In this manner, the mode in which the drive recorder unit 10 stores a video of the outside of the vehicle 5 during traveling of the vehicle is referred to as a normal recording mode. In addition, the drive recorder unit 10 also stores a video of the outside of the vehicle 5 even in a case where the vehicle 5 is impacted such as being shaken when the vehicle 5 is parked. In this manner, the mode in which the drive recorder unit 10 stores a video of the outside of the vehicle 5 in a case where the vehicle 5 is impacted during parking of the vehicle 5 is referred to as a parking monitoring mode. As described above, the drive recorder unit 10 executes video-capturing control on the basis of a plurality of video-capturing modes.

The video-capturing control microcomputer 101 is a computer including, for example, a central processing unit (CPU), a read only memory (ROM), and a random access memory (RAM).

Figure 3:
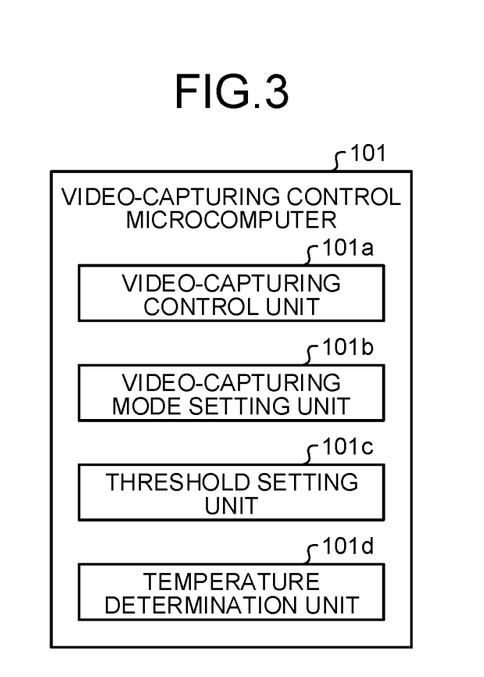
FIG. 3 is a functional block diagram of a video-capturing control microcomputer according to the present embodiment.

Here, the function of the video-capturing control microcomputer 101 will be described with reference to FIG. 3. FIG. 3 is a functional block diagram of the video-capturing control microcomputer 101. As illustrated in FIG. 3, the video-capturing control microcomputer 101 includes a video-capturing control unit 101a, a video-capturing mode setting unit 101b, a threshold setting unit 101c, and a temperature determination unit 101d.

The video-capturing control unit 101a controls the first deserializer 103 and the second deserializer 104 illustrated in FIG. 2 to control reception of a video signal. The video-capturing control unit 101a transmits control signals to the first deserializer 103 and the second deserializer 104 to control the first deserializer 103 and the second deserializer 104.

When a video signal is transmitted from the front camera 31, the video-capturing control unit 101a transmits a control signal to the first deserializer 103 to cause the first deserializer 103 to receive the video signal from the front camera 31. When a video signal is transmitted from the rear camera 32, the video-capturing control unit 101a transmits a control signal to the second deserializer 104 to cause the second deserializer 104 to receive the video signal from the rear camera 32.

The video signals received by the first deserializer 103 and the second deserializer 104 are, for example, serialized video signals. When receiving the video signal, the first deserializer 103 and the second deserializer 104 output the received video signal to the storage control microcomputer 106. Note that the first deserializer 103 and the second deserializer 104 may convert the received video signal into parallel data and output the parallel data to the storage control microcomputer 106.

The video-capturing mode setting unit 101b sets the video-capturing mode described above. When detecting that auto accessory (AutoACC) power is input from the vehicle 5 to the drive recorder unit 10 and the AutoACC power supply is turned on, the video-capturing mode setting unit 101b sets the video-capturing mode to the normal recording mode. That is, the video-capturing mode setting unit 101b sets the video-capturing mode to the normal recording mode with the turn-on of the AutoACC power supply as a trigger. Note that after the vehicle 5 is unlocked from the locked state, at the timing when the door of the vehicle 5 is opened, the AutoACC power is input to the drive recorder unit 10. In addition, at the timing when the vehicle 5 is unlocked from the locked state, the AutoACC power may be input to the drive recorder unit 10. Moreover, the video-capturing mode setting unit 101b sets the video-capturing mode to the parking monitoring mode in a case where a predetermined period has elapsed since the AutoACC power is no longer input.

Furthermore, in a case where the normal recording mode is set, the video-capturing mode setting unit 101b controls the first deserializer 103 and the second deserializer 104 to cause the first deserializer 103 and the second deserializer 104 to receive a video signal. In a case where the parking monitoring mode is set, when the signal obtained from the acceleration sensor 102 illustrated in FIG. 2 indicates a predetermined shake or more of the vehicle 5, the video-capturing mode setting unit 101b controls the first deserializer 103 and the second deserializer 104 to cause the first deserializer 103 and the second deserializer 104 to receive the video signal.

The threshold setting unit 101c sets a threshold for determining whether or not the temperature of the drive recorder unit 10 is high. The threshold value may be set in advance. This threshold is a value based on the heat-resistant temperature of the external storage medium 60 described above. Note that the threshold setting unit 101c may vary the threshold depending on the video-capturing mode. For example, the threshold setting unit 101c may set the threshold of the parking monitoring mode to be lower than the threshold of the normal recording mode. For example, the threshold in the normal recording mode may be set to 70° C., and the threshold in the parking monitoring mode may be set to 80° C. The temperature set as the threshold is lower in the normal recording mode than in the parking monitoring mode. The processing load of the drive recorder unit 10 is higher in the normal recording mode than in the parking monitoring mode. As a result, this is in consideration of the fact that the temperature of the drive recorder unit 10 is more likely to rise in the normal recording mode than in the parking monitoring mode.

The threshold setting unit 101c may set a threshold for determining whether or not the temperature of the drive recorder unit 10 has become sufficiently low by changing the threshold to a temperature about 5° C. lower than the threshold after the temperature determination unit 101d to be described later detects that the temperature has become equal to or higher than the threshold. Note that the threshold setting unit 101c may separately set the threshold for determining whether or not the temperature has become sufficiently low in advance.

Furthermore, in a case where the temperature based on a signal output from the temperature sensor 105 illustrated in FIG. 2 is equal to or higher than the threshold set by the threshold setting unit 101c, the temperature determination unit 101d outputs a signal indicating that the temperature is equal to or higher than the threshold to the storage control microcomputer 106. In addition, in a case where the temperature determination unit 101d detects that the temperature has become equal to or higher than the threshold, the temperature determination unit 101d outputs a signal indicating that the temperature has become equal to or higher than the threshold to the threshold setting unit 101c.

Moreover, in a case where the temperature based on the signal output from the temperature sensor 105 becomes less than the threshold for determining whether or not the temperature has become sufficiently low after detecting that the temperature has become equal to or higher than the threshold, the temperature determination unit 101d outputs the signal indicating that the temperature has become sufficiently low to the storage control microcomputer 106.

Returning to FIG. 2, the description will be continued. The temperature sensor 105 is a temperature sensor incorporated in the drive recorder unit 10, and outputs a signal indicating a temperature to the video-capturing control microcomputer 101 at predetermined intervals. In this manner, the temperature sensor 105 detects the temperature of the drive recorder unit 10.

The storage control microcomputer 106 is a computer including, for example, a central processing unit (CPU), a read only memory (ROM), and a random access memory (RAM). The storage control microcomputer 106 may be configured as, for example, a system on chip (SoC). The ROM stores therein various computer programs. The RAM is a workspace where the CPU executes a computer program. The CPU implements a video reception unit 106a, a storage control unit 106b, and a transfer control unit 106c, those being described later, by executing the computer programs stored in the ROM using the RAM as the workspace. This may be referred to as the storage control microcomputer 106 including the video reception unit 106a, the storage control unit 106b, and the transfer control unit 106c. In other words, this may also be referred to as the driver recorder unit 10 including the video reception unit 106a, the storage control unit 106b, and the transfer control unit 106c. The video reception unit 106a, the storage control unit 106b, and the transfer control unit 106c may be implemented by different hardware.

The storage control microcomputer 106 executes storage control on a video signal. The storage control microcomputer 106 receives a video signal from the first deserializer 103 or the second deserializer 104, and stores the video signal in the memory system 108 or the external storage medium 60.

Figure 4:
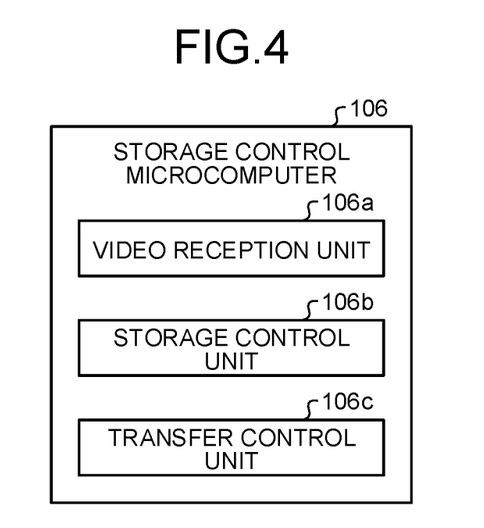
FIG. 4 is a functional block diagram of a storage control microcomputer according to the present embodiment.

Here, the function of the storage control microcomputer 106 will be described with reference to FIG. 4. FIG. 4 is a functional block diagram of the storage control microcomputer 106. As illustrated in FIG. 4, the storage control microcomputer 106 includes the video reception unit 106a, the storage control unit 106b, and the transfer control unit 106c.

The video reception unit 106a receives a video obtained by capturing the outside of the vehicle 5 by receiving a video signal from the first deserializer 103 or the second deserializer 104.

When not receiving the signal indicating that the temperature is equal to or higher than the threshold from the video-capturing control microcomputer 101, the storage control unit 106b stores the video signal in the external storage medium 60. When receiving the signal indicating that the temperature is equal to or higher than the threshold from the video-capturing control microcomputer 101, the storage control microcomputer 106 stores the video signal in the memory system 108.

In a case where the storage control unit 106b receives the signal indicating that the temperature has become sufficiently low when storing the video signal in the memory system 108 in response to receiving the signal indicating that the temperature is equal to or higher than the threshold from the video-capturing control microcomputer 101, the storage control unit 106b stores the video signal in the external storage medium 60.

As described above, the storage control unit 106b performs the storage control processing of changing a storage destination depending on whether or not the temperature of the drive recorder unit 10 is equal to or higher than the threshold.

The storage control unit 106b may temporarily store the video signal received by the first deserializer 103 or the second deserializer 104 in the SDRAM 107, edit various types of information into the stored video signal, and store the edited video signal in the memory system 108 or the external storage medium 60. When storing the video signal in the memory system 108, the storage control unit 106b may attach information indicating that the video signal is stored in the memory system 108 to the video signal as the various types of information.

The transfer control unit 106c transfers the video stored in the memory system 108 to the external storage medium 60 under the transfer condition that the storage control processing is not performed by the storage control unit 106b. For example, when detecting an instruction indicating stop of recording of a video by a user operation, the transfer control unit 106c transfers the video stored in the memory system 108 to the external storage medium 60. Note that the transfer control unit 106c may delete the video transferred to the external storage medium 60 from the memory system 108. As a result, the transfer control unit 106c can free up the capacity of the memory system 108.

Returning to FIG. 2, the memory system 108 is a memory system incorporated in the drive recorder unit 10, and is a flash memory including an IC having a function of leveling storage destinations in the memory system 108. The memory system 108 is, for example, an embedded Multi Media Card (eMMC). The memory system 108 has a higher heat-resistant temperature than the external storage medium 60.

Figure 5:
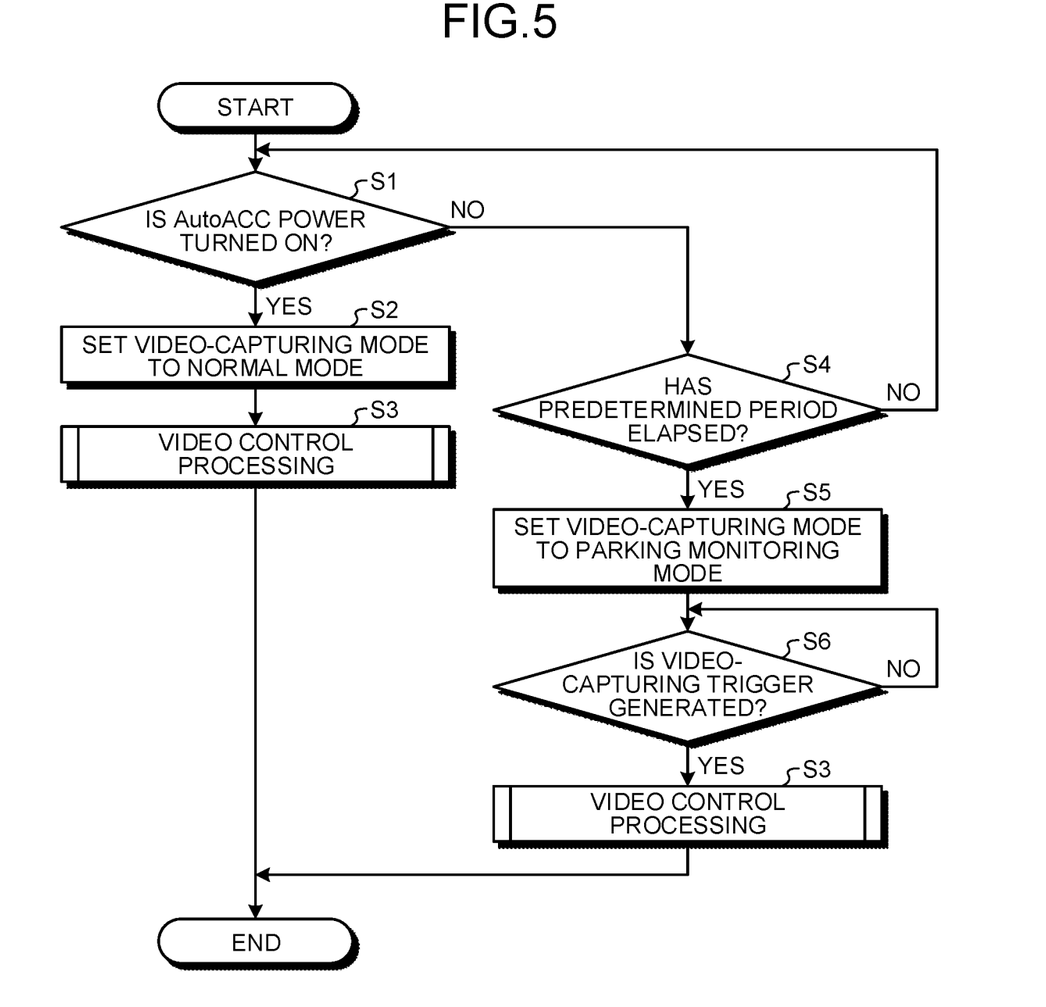
FIG. 5 is a flowchart illustrating a general video processing procedure.
Figure 6:
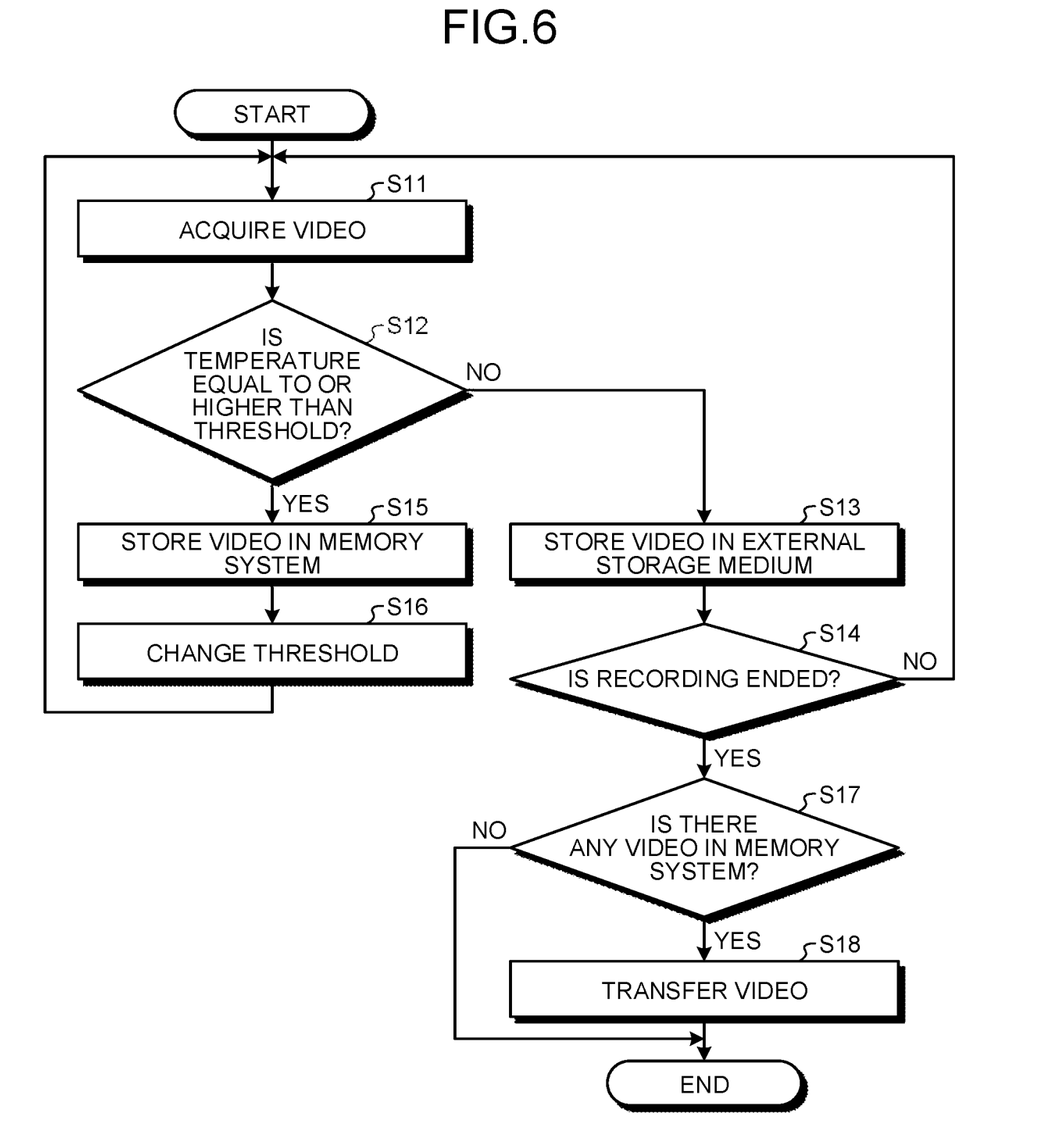
FIG. 6 is a flowchart illustrating a video control processing procedure.

Next, a video processing procedure performed by the drive recorder unit 10 will be described with reference to FIGS. 5 and 6. FIG. 5 is a flowchart illustrating the general video processing procedure. FIG. 6 is a flowchart illustrating a video control processing procedure.

First, the flowchart illustrated in FIG. 5 will be described. As a premise, it is assumed that a so-called constant power supply of the vehicle 5 is on. First, when detecting that the AutoACC power is input and the AutoACC power supply is turned on (step S1: Yes), the video-capturing mode setting unit 101b of the video-capturing control microcomputer 101 sets the video-capturing mode to the normal mode which is the normal recording mode (step S2). Then, the drive recorder unit 10 performs the video control processing (step S3).

If the AutoACC power is no longer input (step S1: No) and a predetermined period has elapsed (step S4: Yes), the video-capturing mode setting unit 101b of the video-capturing control microcomputer 101 sets the video-capturing mode to the parking monitoring mode (step S5). Then, if the signal obtained from the acceleration sensor 102 indicates a predetermined shake or more of the vehicle 5, the video-capturing mode setting unit 101b of the video-capturing control microcomputer 101 determines that a video-capturing trigger is generated (step S6: Yes), and the drive recorder unit 10 performs the video control processing (step S3).

If the condition in step S4 is not satisfied (step S4: No), the process proceeds to step S1. In step S6, if the video-capturing mode setting unit 101b of the video-capturing control microcomputer 101 determines that no video-capturing trigger is generated (step S6: No), the process proceeds to step S6.

Next, details of the processing in step S3 illustrated in FIG. 5 will be described with reference to FIG. 6. First, the video-capturing control unit 101a of the video-capturing control microcomputer 101 controls the first deserializer 103 and the second deserializer 104 to cause the first deserializer 103 and the second deserializer 104 to receive a video signal, and the video reception unit 106a of the storage control microcomputer 106 receives the video signal from the first deserializer 103 and the second deserializer 104 (step S11).

When not receiving a signal indicating that the temperature is equal to or higher than the threshold from the temperature determination unit 101d of the video-capturing control microcomputer 101 (step S12: No), the storage control unit 106b of the storage control microcomputer 106 stores the video signal in the external storage medium 60 (step S13). The transfer control unit 106c of the storage control microcomputer 106 proceeds to step S11 in a case where recording is not ended as a result of determining whether or not the conditions for ending the recording are satisfied, for example, in a case where the instruction indicating stop of recording of a video by a user operation is detected (step S14: No).

In step S12, if the storage control unit 106b of the storage control microcomputer 106 receives the signal indicating that the temperature is equal to or higher than the threshold from the temperature determination unit 101d of the video-capturing control microcomputer 101 (step S12: Yes), the video is stored in the memory system 108 (step S15). Then, after detecting that the temperature is equal to or higher than the threshold, the threshold setting unit 101c of the video-capturing control microcomputer 101 changes the threshold to a threshold about 5° C. lower than the threshold (step S16), and proceeds to step S11.

The transfer control unit 106c of the storage control microcomputer 106 determines whether or not there is a video in the memory system 108 (step S17) in a case where the conditions for ending the recording are satisfied, for example, in a case where the instruction indicating stop of recording of the video by the user operation is detected in step S14 (step S14: Yes).

In step S17, if there is no video in the memory system 108 (step S17: No), the processing ends. In addition, in step S17, if there is a video in the memory system 108 (step S17: Yes), the transfer control unit 106c of the storage control microcomputer 106 transfers the video stored in the memory system 108 to the external storage medium 60 (step S18), and the processing ends.

In the drive recorder unit 10 mounted on the vehicle 5 according to the present embodiment, the first deserializer 103 and the second deserializer 104 receive the video obtained by capturing the outside of the vehicle 5, and the video reception unit 106a of the storage control microcomputer 106 receives the video. In addition, the storage control unit 106b of the storage control microcomputer 106 performs the storage control processing of storing the video in the external storage medium 60 in a case where the temperature detected by the temperature sensor 105 is less than a predetermined threshold, and storing the video in the memory system 108 in a case where the temperature detected by the temperature sensor 105 is equal to or higher than the predetermined threshold.

As described above, in a case where the temperature of the drive recorder unit 10 is equal to or higher than the predetermined threshold, by storing the video in the memory system 108 with a high heat-resistant temperature, the processing of storing the video can be continued in the drive recorder unit 10. For example, depending on the usage condition of the vehicle 5, the temperature of the drive recorder unit 10 may exceed the heat-resistant temperature of the external storage medium 60. By setting the predetermined threshold to a value equal to or lower than the heat-resistant temperature of the external storage medium 60, even in a case where the temperature of the drive recorder unit 10 exceeds or approaches the heat-resistant temperature of the external storage medium 60, the processing of storing the video can be continued. That is, the drive recorder unit 10 can properly store the video captured by the camera mounted on the vehicle 5.

In addition, the transfer control unit 106c of the storage control microcomputer 106 transfers the video stored in the memory system 108 to the external storage medium 60 on condition that the storage control unit 106b of the storage control microcomputer 106 does not perform the storage control processing. This is because it is difficult to simultaneously store the video in an external storage medium 60 and transfer the video from another storage medium to the external storage medium 60. As described above, in the drive recorder unit 10, by transferring the video stored in the memory system 108 to the external storage medium 60, the video can be collected in the external storage medium 60 in which the user can easily check the video.

Furthermore, the drive recorder unit 10 includes video-capturing modes of the normal recording mode and the parking monitoring mode. In the drive recorder unit 10, the threshold varies depending on the video-capturing mode. The drive recorder unit 10 can appropriately switch the destination to which the video is stored by setting different thresholds on the basis of the processing load of each video-capturing mode.

Further, after the temperature becomes equal to or higher than the threshold, the drive recorder unit 10 stores the video in the external storage medium 60 on the basis of a threshold that is lower than the threshold and is used to determine whether or not the temperature has become sufficiently low. As described above, after the temperature becomes equal to or higher than the threshold, the drive recorder unit 10 stores the video in the external storage medium 60 on the basis of the threshold lower than the threshold, so that it is possible to prevent the storage destination from being frequently changed and the processing from becoming complicated in a case where the frequency of the temperature change is high.

In the above embodiment, the case where the transfer control unit 106c of the storage control microcomputer 106 transfers the video stored in the memory system 108 to the external storage medium 60 on the condition that the recording is ended has been described. However, the condition that the vehicle 5 is stopped may be included in the conditions for the transfer processing. For example, the condition that the vehicle 5 is stopped may be used. In other words, the transfer control unit 106c of the storage control microcomputer 106 may transfer the video stored in the memory system 108 to the external storage medium 60 on condition that the storage control unit 106b does not perform the storage control processing and the vehicle 5 is stopped. The transfer control unit 106c of the storage control microcomputer 106 may determine whether the vehicle 5 is stopped by determining whether or not the AutoACC power is input. Furthermore, the transfer control unit 106c of the storage control microcomputer 106 may determine whether the vehicle 5 is stopped by determining whether or not a signal indicating that the ignition is off is received from a sensor device that detects the state of the ignition. As described above, by including the condition that the vehicle 5 is stopped in the conditions for the transfer processing, the drive recorder unit 10 can perform the transfer processing at a timing at which there is a low possibility that the processing of storing the video in the external storage medium 60 or the memory system 108 is performed.

In the above embodiment, the case where the transfer control unit 106c of the storage control microcomputer 106 transfers the video stored in the memory system 108 to the external storage medium 60 on condition that the recording is ended has been described. However, the condition that the temperature of the drive recorder unit 10 is equal to or lower than a predetermined threshold may be included in the conditions for the transfer processing. In other words, the transfer control unit 106c of the storage control microcomputer 106 may transfer the video stored in the memory system 108 to the external storage medium 60 on condition that the storage control unit 106b does not perform the storage control processing and the temperature of the drive recorder unit 10 is equal to or lower than the predetermined threshold. The threshold may be a value based on the heat-resistant temperature of the external storage medium 60. As described above, by including the condition that the temperature of the drive recorder unit 10 is equal to or lower than the predetermined threshold in the conditions for the transfer processing, the drive recorder unit 10 can perform the transfer processing in a state where the video can be stored in the external storage medium 60. Note that the transfer control unit 106c of the storage control microcomputer 106 may determine that the temperature of the drive recorder unit 10 is equal to or lower than the predetermined threshold by determining whether or not the signal indicating that the temperature has become sufficiently low is received from the video-capturing control microcomputer 101.

Furthermore, the threshold setting unit 101c may set the threshold lower as the number of processing functions in the drive recorder unit 10 increases. For example, the threshold setting unit 101c may change the threshold depending on the number of functional units operated by the drive recorder unit 10.

Specifically, the threshold setting unit 101c sets the threshold in a case where the first deserializer 103 and the second deserializer 104 are operated to be lower than the threshold in a case where only the first deserializer 103 is operated. That is, the threshold setting unit 101c may set the threshold in a case where the video is received from the front camera 31 and the rear camera 32 to be lower than the threshold in a case where the video is received only from the front camera 31.

Furthermore, in the above embodiment, the case where the video-capturing mode setting unit 101b sets the video-capturing mode to the parking monitoring mode in a case where the predetermined period has elapsed since the AutoACC power is not input has been described. However, the video-capturing mode setting unit 101b may set the video-capturing mode to the parking monitoring mode in a case where the AutoACC power is not input and the predetermined period has elapsed since the signal indicating that the ignition is off is received from the sensor device that detects the state of the ignition.

The program executed by the drive recorder unit 10 is provided by being stored, as a file in an installable format or an executable format, in a computer-readable storage medium such as an optical storage medium such as a digital versatile disk (DVD) or a semiconductor memory device such as a USB memory or a solid state disk (SSD).

In addition, the program executed by the drive recorder unit 10 of the present embodiment may be configured to be stored on a computer connected to a network such as the Internet and provided by being downloaded via the network. Furthermore, the program executed by the drive recorder unit 10 of the present embodiment may be configured to be provided or distributed via a network such as the Internet.

Further, the program of the drive recorder unit 10 according to the present embodiment may be configured to be provided by being incorporated in a ROM or the like in advance.

Although the embodiments of the present disclosure have been described above, the above embodiments have been presented as examples, and are not intended to limit the scope of the invention. These novel embodiments can be implemented in various other forms, and various omissions, substitutions, and changes can be made without departing from the gist of the invention. These novel embodiments and modifications thereof are included in the scope and gist of the invention, and are included in the invention described in the claims and the equivalent scope thereof. Furthermore, constituent elements in different embodiments and modifications may be appropriately combined.

Furthermore, the effects of the embodiments described in the present specification are merely examples and are not limited, and other effects may be provided.

Although several embodiments of the present disclosure have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

The video processing apparatus according to the present disclosure can properly store the video captured by the camera mounted on the vehicle.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video processing apparatus that is mounted on a vehicle and stores a video by a camera capturing at least one of outside or inside of the vehicle, the video processing apparatus comprising:
    a memory that stores therein a computer program; and
    a processor that is connected to the memory, wherein the processor performs processing by executing the computer program, the processing including
    receiving the video; and
    storing the video in an external storage medium in a case where a temperature of the video processing apparatus is less than a predetermined threshold, and storing the video in a storage device incorporated in the video processing apparatus in a case where the temperature is equal to or higher than the threshold.

2. The video processing apparatus according to claim 1, wherein the processing further includes transferring a video stored in the storage device to the external storage medium on condition that the storing the video is not performed in any of the external storage medium and the storage device.

3. The video processing apparatus according to claim 1, wherein
the capturing has modes including a first mode that is a video-capturing mode triggered by turn-on of a predetermined power supply of the vehicle and a second mode that is a video-capturing mode during parking, and
the threshold of the first mode is set to be lower than the threshold of the second mode.

4. The video processing apparatus according to claim 1, wherein the processing includes, after the temperature becomes equal to or higher than the threshold, storing the video in the external storage medium on basis of a further threshold that is lower than the threshold.

5. The video processing apparatus according to claim 2, wherein the processing includes transferring a video stored in the storage device to the external storage medium on condition that the storing the video is not performed in any of the external storage medium and the storage device and that the vehicle is stopped.

6. The video processing apparatus according to claim 2, wherein the processing includes transferring a video stored in the storage device to the external storage medium on condition that the storing the video is not performed in any of the external storage medium and the storage device and that the temperature is less than the threshold.

7. The video processing apparatus according to claim 2, wherein the processing includes deleting the video transferred to the external storage medium from the storage device.

8. The video processing apparatus according to claim 3, wherein the predetermined power supply includes an accessory power supply.

9. The video processing apparatus according to claim 3, wherein the processing includes, when the second mode is set on, receiving the video on condition that a predetermined or more shake of the vehicle has been received.

10. The video processing apparatus according to claim 5, wherein the processing includes determining that the vehicle is stopped by determining whether a predetermined power of the vehicle is input.

11. The video processing apparatus according to claim 5, wherein the processing includes determining that the vehicle is stopped by determining whether a signal indicating that an ignition is off is received from a sensor device that detects a state of the ignition.

12. The video processing apparatus according to claim 5, wherein the processing includes deleting the video transferred to the external storage medium from the storage device.

13. The video processing apparatus according to claim 6, wherein the processing includes deleting the video transferred to the external storage medium from the storage device.

14. The video processing apparatus according to claim 1, wherein the threshold is changeable, and the threshold is set lower as a number of functions performed by the video processing apparatus increases.

15. The video processing apparatus according to claim 1, wherein a heat-resistant temperature of the storage device is higher than a heat-resistant temperature of the external storage medium.

* * * * *